United States Patent
Simon et al.

(10) Patent No.: US 7,617,048 B2
(45) Date of Patent: Nov. 10, 2009

(54) METHOD FOR DETERMINING AN ACCIDENT RISK BETWEEN A FIRST OBJECT WITH AT LEAST ONE SECOND OBJECT

(75) Inventors: Stephan Simon, Sibbesse (DE); Brad Ignaczak, Canton, MI (US); Robert Lyons, South Lyon, MI (US)

(73) Assignee: Robert Bosch GmbH, Stuttgart (DE)

( * ) Notice: Subject to any disclaimer, the term of this patent is extended or adjusted under 35 U.S.C. 154(b) by 319 days.

(21) Appl. No.: 10/533,778

(22) PCT Filed: May 2, 2003

(86) PCT No.: PCT/DE03/01409

§ 371 (c)(1),
(2), (4) Date: May 3, 2005

(87) PCT Pub. No.: WO03/096068

PCT Pub. Date: Nov. 20, 2003

(65) Prior Publication Data

US 2006/0041381 A1 Feb. 23, 2006

Related U.S. Application Data

(60) Provisional application No. 60/378,444, filed on May 7, 2002.

(30) Foreign Application Priority Data

Dec. 11, 2002 (DE) .............. 102 57 842 U

(51) Int. Cl.
*B60Q 11/00* (2006.01)
(52) U.S. Cl. ...................... 701/301; 280/735

(58) Field of Classification Search ............... 701/45, 701/301, 302; 340/435, 576, 439, 945, 905, 340/438, 903; 280/735, 733, 734; 180/170, 180/171, 172, 274

See application file for complete search history.

(56) References Cited

U.S. PATENT DOCUMENTS

| | | | |
|---|---|---|---|
| 5,557,278 A * | 9/1996 | Piccirillo et al. ............... 342/29 |
| 5,572,428 A | 11/1996 | Shinnosuke et al. |
| 5,594,414 A * | 1/1997 | Namngani ................... 340/436 |
| 5,949,366 A | 9/1999 | Herrmann |
| 6,035,053 A * | 3/2000 | Yoshioka et al. ............ 382/104 |
| 6,085,151 A | 7/2000 | Michael et al. |
| 6,256,565 B1 | 7/2001 | Yanagi et al. |
| 6,469,656 B1 | 10/2002 | Wagner et al. |
| 6,587,074 B1 | 7/2003 | Winter et al. |

(Continued)

FOREIGN PATENT DOCUMENTS

DE 100 20 744 6/2001

(Continued)

*Primary Examiner*—Dalena Tran
(74) *Attorney, Agent, or Firm*—Kenyon & Kenyon LLP

(57) ABSTRACT

A method for determining an accident risk of a first object with at least one second object is proposed, a collision probability and a hazard probability of the at least one second object being determined in a predefined region around the first object, the collision probability and the hazard probability being determined as a function of motions and object classes of the first and the at least one second object. The accident risk is then determined as a function of the collision probability and the hazard probability.

18 Claims, 4 Drawing Sheets

U.S. PATENT DOCUMENTS

| | | | |
|---|---|---|---|
| 6,606,052 B1 | 8/2003 | Miyahara | |
| 6,633,815 B1 | 10/2003 | Winter et al. | |
| 6,675,094 B2 * | 1/2004 | Russell et al. | 701/301 |
| 6,691,034 B1 * | 2/2004 | Patera et al. | 701/301 |
| 6,721,659 B2 * | 4/2004 | Stopczynski | 701/301 |
| 6,819,991 B2 * | 11/2004 | Rao et al. | 701/45 |
| 2001/0018641 A1 * | 8/2001 | Kodaka et al. | 701/301 |
| 2003/0139881 A1 * | 7/2003 | Miller et al. | 701/301 |

FOREIGN PATENT DOCUMENTS

| | | |
|---|---|---|
| JP | 62278700 | 12/1987 |
| JP | 9293199 | 11/1997 |
| WO | WO01/50152 | 7/2001 |

* cited by examiner

METHOD FOR DETERMINING AN ACCIDENT RISK BETWEEN A FIRST OBJECT WITH AT LEAST ONE SECOND OBJECT

CROSS-REFERENCE TO RELATED APPLICATION

This application claims priority to U.S. Provisional application 60/378,444, which is hereby incorporated by reference and which was filed on May 7, 2002.

BACKGROUND INFORMATION

The present invention is directed to a method for determining an accident risk of a first object with at least one second object.

SUMMARY OF THE INVENTION

The method according to the present invention for determining an accident risk of a first object with at least one second object has the advantage that the collision probability of an own vehicle with one or more other objects can be determined. These collision probabilities can be evaluated, for example, by a control unit for restraint systems or other safety systems and used, even before the collision occurs, to initiate actions that mitigate the effects of the collision or in fact prevent it.

The method according to the present invention requires the detection of objects, and determines the status of the own object and of the other objects in the vicinity, the collision probability and a hazard probability between the own object and the other objects being determined. An accident risk is then derived therefrom. The "hazard probability" is understood here as a probability of at least a near miss; this means that a region is drawn around the own object, and the probability that other objects might enter that region around the own object is calculated. The collision itself is thus also detected from the hazard probability. The "collision probability," on the other hand, means that an overlap or crash occurs between the own object and at least one other object. An optional classification can be used to refine the accuracy of the collision prediction.

The method according to the present invention receives the current status of the own object and the status of the other objects, in real time, from other functions (e.g. a Kalman filter) that execute in the object. From an optional classification function, the method according to the present invention receives the object types—e.g. pedestrian, bicyclist, small motor vehicle, medium motor vehicle, large motor vehicle or truck—in order to determine, using that information and a predefined dynamic vehicle model (one for each specific vehicle class, and optionally as a function of a vehicle behavior model), the collision probability and hazard probability. Each object has a dynamic model of this kind assigned to it, so that the future behavior of the object can be optimally estimated in consideration of current parameters such as speed and acceleration. In addition, a behavior model for the driver or pedestrian can be taken into account here. This model then indicates in each case how probable behaviors are under the given boundary conditions. Incorporation of this model also improves the prediction of the future position of an object or traffic participant.

A Kalman filter can be generated for each observed object. The motion possibilities of the object are embodied in the Kalman filter in model form. The Kalman filter allows optimum combination of the new observations, which generally contain errors, and the model knowledge.

This information then permits a determination of the accident risk so that an actuator suite can be triggered, if applicable, even before a possible collision. This can result in optimum protection of a vehicle occupant and/or other vehicle occupants such as pedestrians. Control aids for collision avoidance can also be optimally used in this fashion.

Present-day safety systems for vehicles detect collisions after the accident has begun, so that in general there is no possibility for an action that might prevent or mitigate the collision. Such action, could, however, mean valuable time for the vehicle occupants and/or other traffic participants such as pedestrians. The method according to the present invention makes this possible, and also permits the corresponding application of countermeasures. The method according to the present invention permits the application of countermeasures that require more time than those that can be used when a collision has already occurred. For example, a visual or acoustic warning, proceeding from the method according to the present invention for determining an accident risk, can be outputted promptly enough to provide the driver with sufficient time to react in order to avoid the collision. In addition, the method according to the present invention allows a vehicle behavior model to be modified so that in the event of a high accident risk, it can react accordingly. As a result, it is possible for the method according to the present invention to adjust to behavior patterns of individual drivers.

The method according to the present invention makes it possible to store a variety of motion sequences with probabilities, in order then to initiate countermeasures as a function of the hazard probability. Only when the combination of individual states results in a high hazard probability can initiation of a countermeasure be indicated. The method according to the present invention is suitable in particular for two-dimensional cases, i.e. motions, for example, on roads or on water surfaces. It is also possible, however, to apply the method according to the present invention in a three-dimensional space. The method according to the present invention is thus also usable for air traffic and the motion of robots, or for use in underwater traffic.

BRIEF DESCRIPTION OF THE DRAWINGS

Exemplified embodiments of the invention are depicted in the drawings and are explained in more detail in the description below.

DETAILED DESCRIPTION OF THE INVENTION

Figure 1:
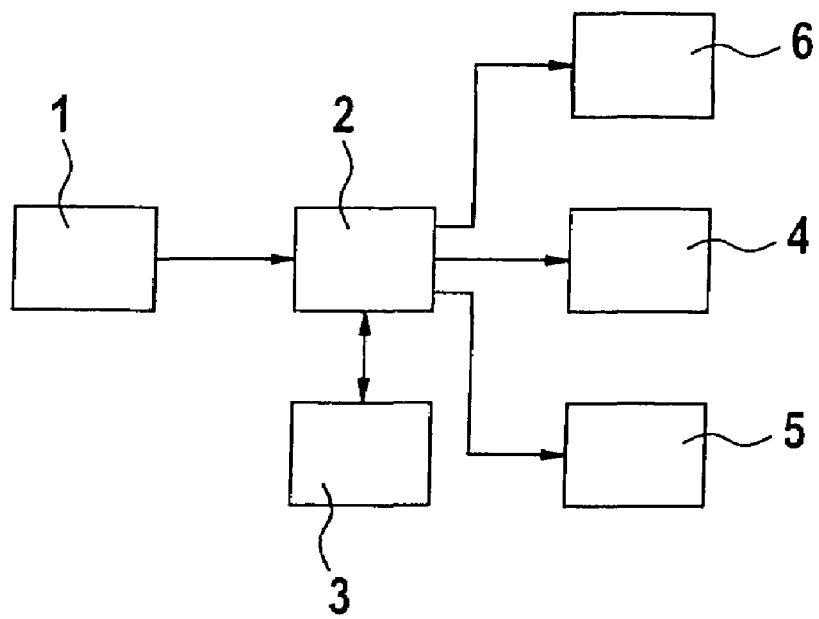
FIG. 1 is a block diagram of an apparatus according to the present invention.

It is particularly advantageous that the motion and the object class of the at least one second object are determined by a sensor apparatus, and the motion and object class of the first object are retrieved from at least one data source. This means that the other objects—for example pedestrians, bicyclists, and other vehicles—surrounding the first object—for example a vehicle—are sensed using a sensor suite such as a pre-crash sensor suite, so that they can be classified and have motion parameters assigned to them. The own-vehicle values are retrieved from internal data sources, i.e. the vehicle type, current speed, direction, and a vehicle behavior model. Such sources are thus internal sensors and memories.

It is additionally advantageous that the motion of the first object is defined at least by way of its current position and its velocity. This yields a velocity vector that defines the relationship to the other objects. The motion of the other objects is defined at least by way of their current position. If stationary objects are involved, it is therefore not necessary to determine their velocity; only their position needs to be determined in order to determine the collision and hazard probabilities. For the first object, its longitudinal and/or transverse acceleration and/or its rotation angle or variables derived therefrom and/or its steering angle can additionally be used as further parameters for definition of the motion. Environmental influences, i.e. the road condition or defined maximum speeds, and/or a respective vehicle behavior, can be taken into consideration by the corresponding model in determining the motion.

Lastly, it is also advantageous that as a function of the accident risk, an indication, i.e. a warning to the driver, and/or a message and/or at least one signal to an actuator suite, is generated. A control unit in a vehicle, or a restraint system, can preferably be used in the method according to the present invention. Motor vehicles, ships, aircraft, and robots are possible as objects.

Impact sensors are already in common use in motor vehicles. In addition, pre-crash sensors such as radar or ultrasound or video are also increasingly being used to monitor the vehicle surroundings. On the basis of this kind of all-around view, reversible restraint means such as belt tensioners, for example, can be used as a risk approaches. A more accurate analysis of the motion of the objects surrounding the vehicle is necessary, however, in order for suitable countermeasures to be applied in as prompt and situationally appropriate a manner as possible.

The present invention now proposes a method for determining an accident risk that analyzes surroundings data more accurately so that countermeasures can thus be applied in situationally appropriate fashion. In particular, a hazard probability, which also considers the immediate vicinity around an object, is calculated here in addition to a collision probability. The method according to the present invention is not limited to utilization for road traffic, however; it can also be used for air traffic and shipping, in situations where robots are used, and for other applications.

FIG. 1 shows an apparatus according to the present invention as a block diagram. A surroundings sensor suite 1 is connected to a processor 2. Sensor suite 1 transfers measured data to processor 2, which processes them. For that processing, processor 2 is connected via a data input/output to a memory 3. Processor 2 is connected via a first data output to an indicator 4. This indicator 4 serves to warn a driver, and is preferably embodied here as an optical indicator. Alternatively, it is possible for indicator 4, additionally or instead, to have a loudspeaker in order, also or alternatively, to warn the driver acoustically. A haptic warning by way of moving elements, in order to warn the driver by touch, is also conceivable here.

Processor 2 is connected via a second data output to a restraint system 5 that is used to protect the occupants in the event of an impact. Restraint system 5 encompasses restraint means such as a belt tensioner and airbags that are used for various body parts. The belt tensioners can be embodied pyrotechnically and/or reversibly, a reversible belt tensioner usually being operated by an electric motor. In addition to normal front airbags, side airbags, knee bags, and other airbags for special types of accident can be used.

Processor 2 uses data via an interior sensing system upon utilization of these restraint means 5. The result is that if use of the restraint means is possibly hazardous, that use is suppressed in order to prevent injuries resulting from such restraint means. This applies, for example, when the person in question is located too close to a restraint means (e.g. is "out of position"), or when the person in question weighs so little that the force applied by an airbag might cause injuries. Pressure-based systems such as a seat mat or force sensors, or also wave-based interior sensor suites such as ultrasound, video, or infrared or high-frequency, can be used as the interior sensor suite. Processor 2 is connected via a third data output to an active steering aid 6 in order to assist the driver in avoiding a collision. It is possible for the processor to be connected only to restraint means 5 and/or to indicator 4 and/or to steering aid 6.

Restraint means 5 also include restraint means for the protection of pedestrians or bicyclists. These include raising the hood in order to protect such persons from impact against the engine block or windshield. The absorption characteristics of the bumper can also be appropriately adapted, and the vehicle or vehicle front can be raised or lowered in order to achieve improved crash compatibility. External airbags are also usable here in order to protect pedestrians and other traffic participants, for example in a vehicle/vehicle collision.

Processor 2 then evaluates the sensor signals of sensor suite 1 in order to combine them with a model—the dynamic vehicle model and optionally the driver model—that is loaded from memory 3. Data from data sources in the vehicle, temporarily stored in memory 3, are also needed in order to calculate the collision speed and approach speed. Those data include the own-vehicle type, speed, speed direction, acceleration in the vehicle, and also rotational acceleration expressed as rotation angles.

Using the collision and hazard probabilities, it is possible for processor 2 to calculate the accident risk for the current scenario as a function of the loaded data. Corresponding countermeasures are initiated as a function of that accident risk. A restraint system, or a system for acting on the vehicle behavior, can therefore then operate in situationally appropriate fashion.

Figure 2:
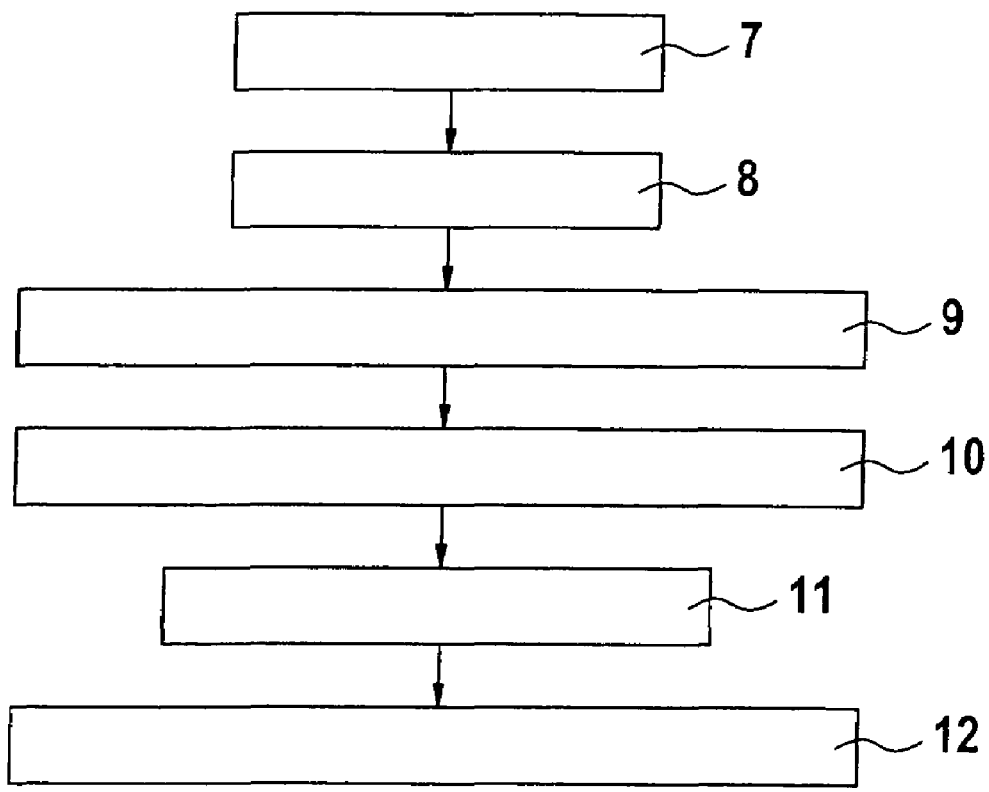
FIG. 2 is a flow chart of the method according to the present invention.

FIG. 2 shows, as a first flow chart, the method according to the present invention for determining an accident risk. In method step 7, a characterization of the motion of collision objects in the vehicle's surroundings is performed by sensor suite 1. This characterization is accomplished on the basis of the following parameters: current position, relative speed with respect to the observed object, and the longitudinal and transverse acceleration and rotational acceleration of the respective objects. An optional classification of the individual collision objects is furthermore performed by processor 2. This classification includes the vehicle type. That vehicle type is ascertained by sensor suite 1. Pattern recognition means can preferably be used in order to evaluate the sensor signals (e.g. video, radar, or ultrasound signals) and assign them to vehicle types. The motion parameters of the vehicle to be observed are also ascertained by way of sensor suite 1. As stated above, these include the vehicle position, vehicle speed, accelerations in the longitudinal and transverse directions, and rotational accelerations, all of which are derivable from such all-around view signals. Alternatively, it is possible for a communication to exist between the vehicles, making possible an exchange of such vehicle data.

In method step 8, the motion and object class are performed by retrieval from a memory, for example memory 3, in the vehicle in which the method according to the present invention is executing. The speed is known by way of the speedometer; longitudinal, transverse, and angular accelerations can be determined by way of internal acceleration sensors; the steering angle can be ascertained by a corresponding sensor. The object class, i.e. the vehicle model, can be stored in a memory. As an alternative to the speedometer, the speed can be determined by way of a satellite-assisted location signal such as GPS; radar sensors can also be used here in combination with inertial sensors.

From these data it is then possible, in method steps 9 and 10, to determine the collision probability and hazard probability. A dynamic model of the vehicle is used here. This dynamic model is dependent on the object class and can thus be loaded, for each vehicle, from memory 3. A driver behavior model can additionally be taken into consideration. This driver behavior model contains at least one model that assigns a probability to an action of the driver. In conjunction with the dynamic model of the vehicle, this enables the method according to the present invention to assign probabilities to all possible future states of the one vehicle and the other objects. A state encompasses at least the position, and optionally also the speed and orientation, as well as accelerations, rotation rates, and rotational accelerations.

In the simplest case only a driver behavior model is used, which is then the same for the own vehicle and the other objects. This model can be improved for the own vehicle using an adaptive model by using a driver observation sensor, or by observation of the driver's reaction in critical situations. In method step 11, the accident risk is then estimated by the collision probability and hazard probability that have been determined. As a function of the accident risk, an initiation of countermeasures is then performed in method step 12. These countermeasures include activation of restraint systems, output of warnings to the driver, and driver assistance in avoiding collisions.

Figure 3:
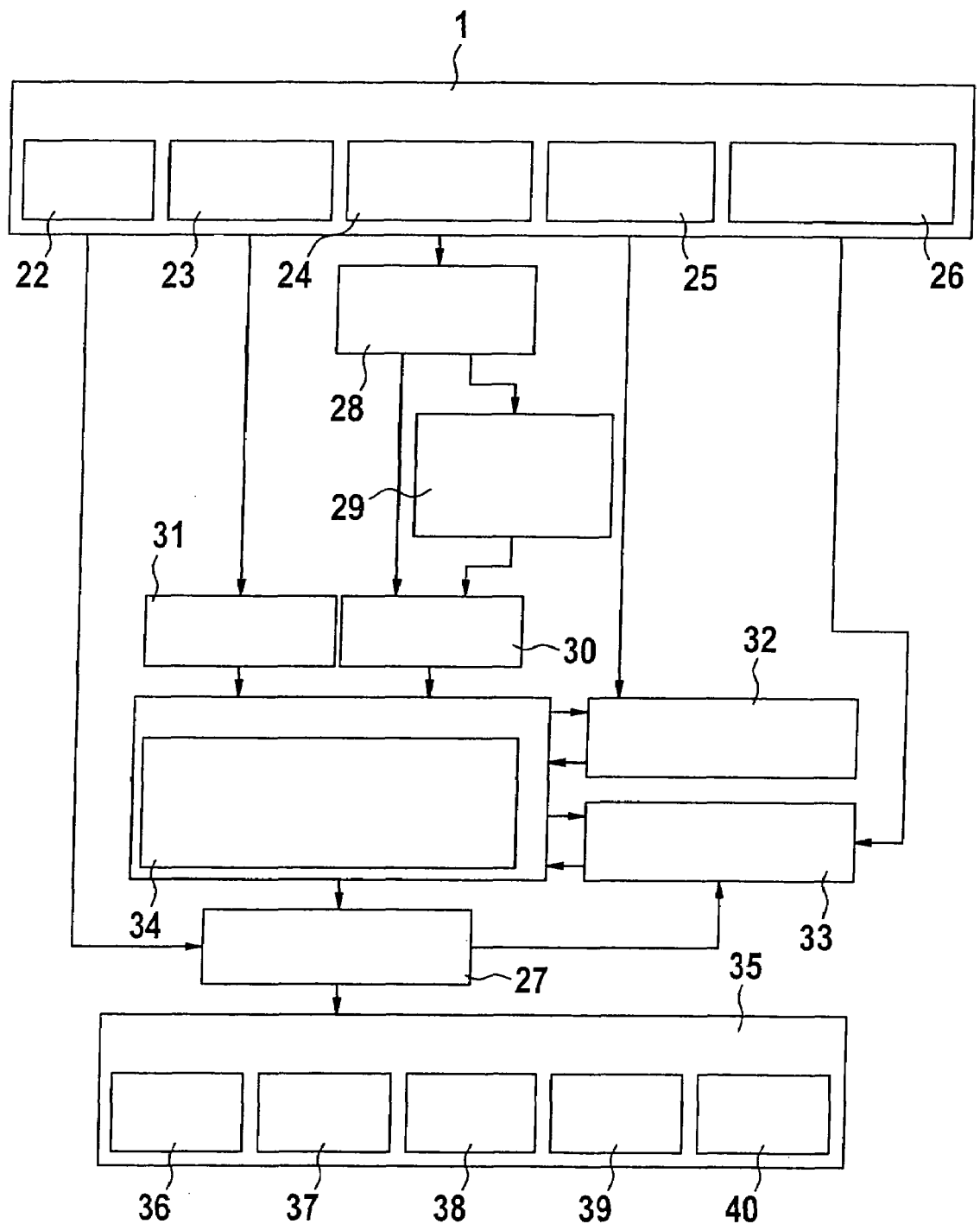
FIG. 3 is a block diagram of the method according to the present invention.

FIG. 3 shows, in a block diagram, the execution of the method according to the present invention. Sensor suite 1 here has impact sensors 22, sensors for detecting vehicle dynamics 23, surroundings sensors 25, environment sensors 25, and driver observation sensors 26. It is possible to dispense with environment sensors 25 and driver observation sensors 26. Impact sensors 22 supply a signal that is used in block 27 to determine the accident risk and the activation of the actuator suite. Vehicle dynamics sensors 23 are used to track the motion of the own vehicle in block 31. These data then go into block 34, in which the collision probability and hazard probability are determined.

Surroundings sensors 24 supply their data to an object detection system 28. Object detection system 28 introduces the object detection data into a classification module 29 in order to classify the surrounding objects. Those objects are then, in the next block 30, tracked using data from the object classification and object detection systems. These tracking data of block 30 are then also used in block 34 to determine the collision probability and hazard probability, although vehicle dynamics model 32 and optionally driver behavior model 33 are also taken into account in this context. Data from environment sensors 25 go into vehicle dynamics model 32. These sensors 25 supply data regarding the road, friction, and optionally temperature, as well as other parameters. Vehicle dynamics model 32 is then adapted therewith. Data from driver observation sensor 26 go into driver behavior model 33. This sensor 26 supplies data concerning the driver's attentiveness. Sensors that observe eyelid blinking, for example, can be used for this, although other vigilance sensors are also usable.

The collision and approach probabilities determined in block 34 are conveyed to module 27 in order to determine the accident risk. Data are also conveyed from block 27 to driver behavior model 33, however, in order to adapt the driver behavior model as a function of the driver's actions. Model 27 then performs an activation of actuator suite 35 as a function of the accident risk. This includes a restraint system 36; a collision avoidance system 37, e.g. by way of an automatic steering intervention or automatic braking action; a crash mitigation system 38, for example an adaptation of the bumper, raising/lowering of the vehicle front, vehicle/vehicle airbags, or collapsible front wheels in order encourage the colliding vehicles to slide apart; a pedestrian protection apparatus 39, for example a raising of the hood or pedestrian airbags; and a driver warning 40, which can be implemented by way of indicator 4 or a loudspeaker. A haptic output is possible here as well.

Figure 4:
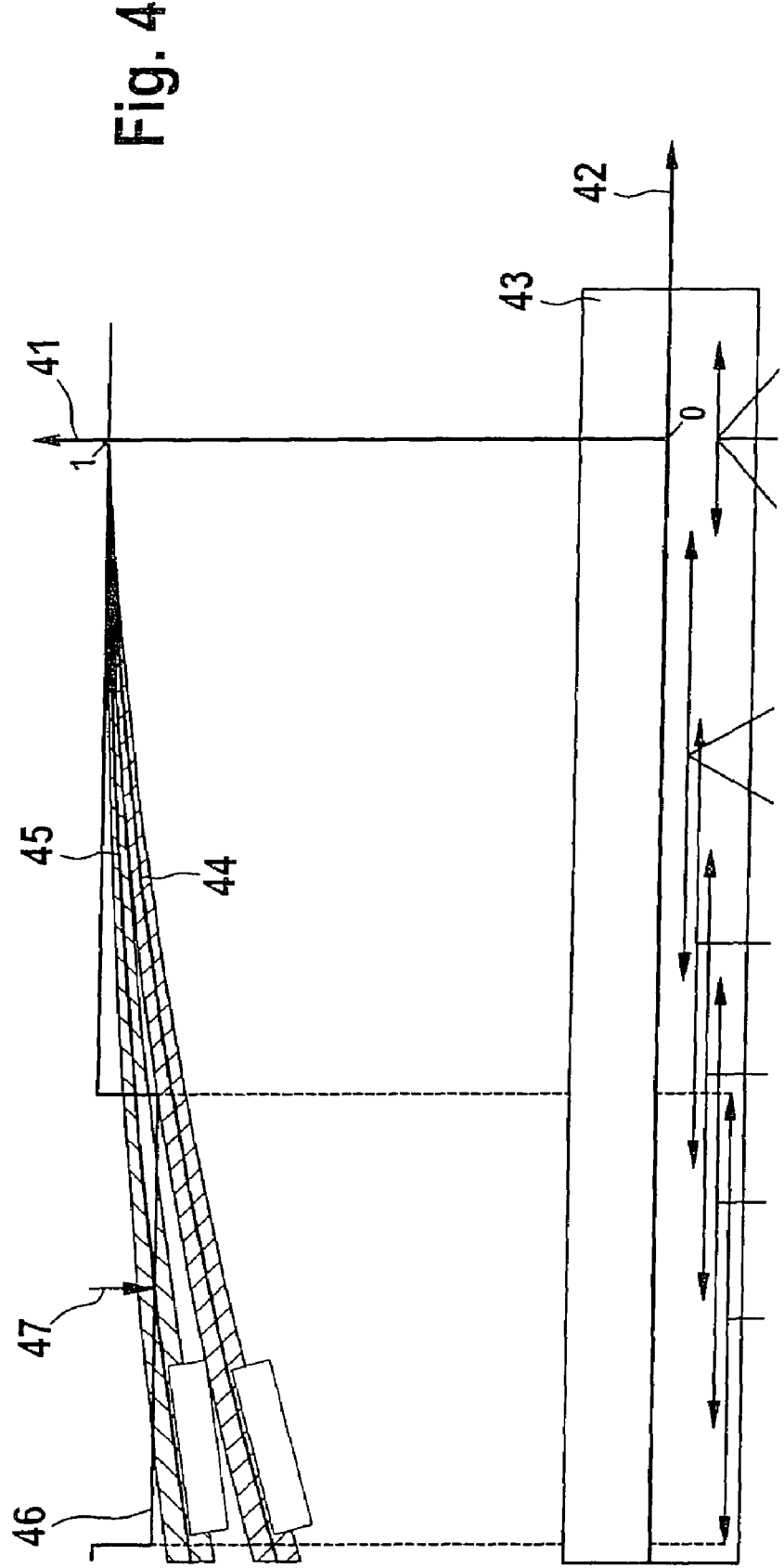
FIG. 4 is a diagram of the times required by various countermeasures for activation.

FIG. 4 is a diagram showing the times required for activation of various countermeasures and, by way of example, the calculated probabilities of the time to collision. The collision probability and hazard probability are plotted on the ordinate 41; each can assume a maximum value of 1. The value 1 means that the collision or hazard will definitely occur within the predicted time.

The time before the collision needed to initiate a countermeasure is depicted on abscissa 42. This time requirement is described qualitatively in 43. Certain actions can be initiated even after the collision; other actions require milliseconds to seconds before the collision. Below the time axis, a variety of countermeasures are arranged on the time axis in accordance with their respective time requirements. The double arrows qualitatively show time spans for the beginning of activation. When that time span has elapsed, the countermeasure should no longer be activated.

Curve 44 shows, as a typical example, the collision probability rising with decreasing time until the collision, and curve 45 shows the similarly rising hazard probability. These profiles are typical of cases in which a collision later actually occurs.

The hazard probability is in principle greater than or equal to the collision probability, since the hazard, which means an excessively close pass, includes the instance of a collision.

Behind curves 44 and 45, and cross-hatched in each case, is the unavoidable uncertainty regarding the result for the collision and hazard probabilities. This uncertainty is caused, for example, by measurement errors. It tends to decrease as time proceeds, since the number of observations rises and the measurement errors likewise become small for a smaller object distance.

The earlier the countermeasure must be initiated, the greater the remaining probability at that point in time that the collision will not occur, i.e. that the countermeasure is initiated unnecessarily. This may result, for example, from the fact that an escape opportunity still exists that an experienced driver might perceive.

Countermeasures that require a long activation time should consequently, if possible, cause no damage or only minor damage if improperly triggered.

The calculated values for the collision probability and hazard probability can be compared with thresholds. If the probability under consideration exceeds the threshold during the time period characterized by a double arrow, the corresponding countermeasure can then be activated. Activation also takes place if the threshold has already been exceeded as that time period is entered. The point in time for enabling activation is defined by the first intersection point 47 of curve 44 or 45 with curve 46. Threshold 46 need not necessarily be constant; thresholds that change over time are also usable.

Example: For the "Warn driver" countermeasure, curve 46 depicting the threshold for activation of a warning is drawn in by way of example. (Additional thresholds have been omitted for reasons of clarity.) If the hazard probability exceeds that threshold during the time period characterized by the double arrow, a warning is then outputted. Once that time period has elapsed, there is no further need to output a warning, since the driver no longer has sufficient time for a reaction.

For countermeasures such as, for example, warning the driver, which in turn cause no damage in normal circumstances, the hazard probability can be utilized for comparison with the threshold in order to provide a warning even before the threat of a near miss. For other countermeasures, the collision probability is preferable. There is no difference in principle between the two probabilities; the collision probability merely represents a special case of the hazard probability.

Close to the origin of the diagram, the time needed in order to initiate a countermeasure is very short. Ultimately, the only action here is to modify the airbag triggering algorithm. If the time for initiation of countermeasures is somewhat greater, the pyrotechnic belt tensioner can then also still be used. If even more time is available, the reversible belt tensioner can also be used. With even more time, measures can be taken to enhance vehicle compatibility for a crash. As the next stage, it is possible to activate automatic braking. If even more time is available, automatic steering can also be taken into consideration. As the lowest action, the driver's reaction can be observed and he/she can be given acoustic or optical instructions as applicable.

Figure 5:
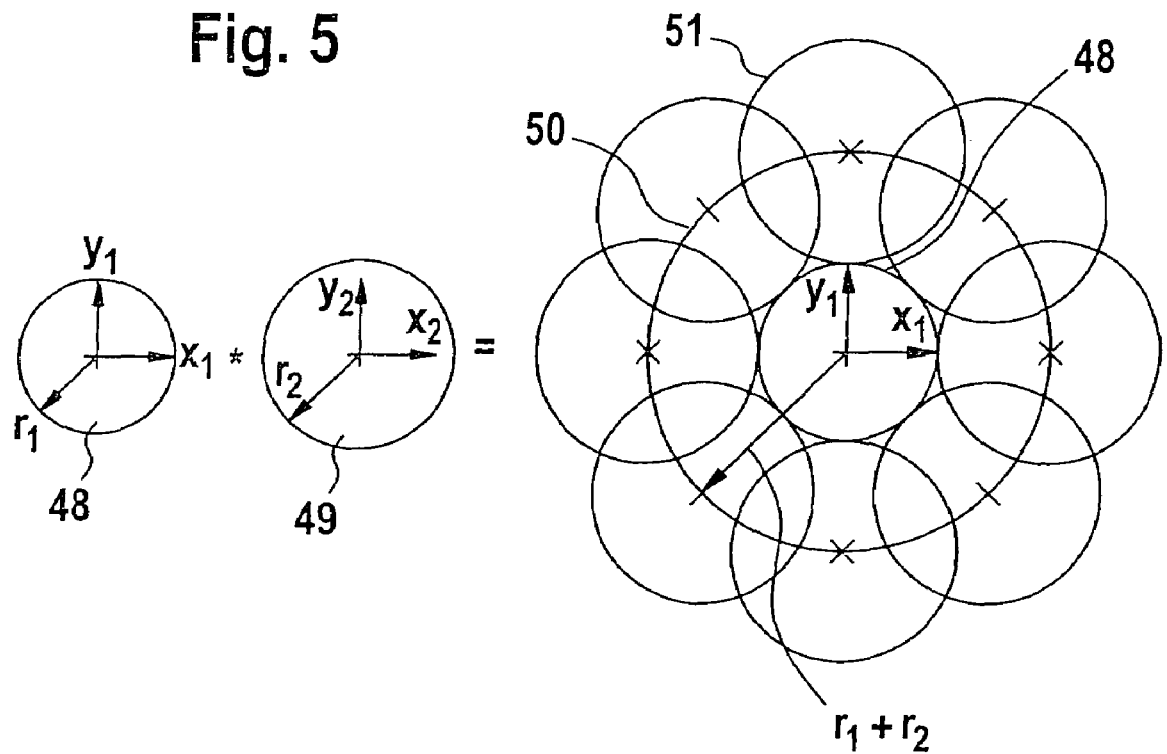
FIG. 5 shows a first model for determining the hazard probability.

FIG. 5 shows schematically, from a bird's-eye perspective, how the collision probability can be determined. Own object 48 is here convoluted with second object 49, so that region 50 is created in the coordinate system of the own object. This involves placing the own object with its reference point "+" at the origin, and disposing second object 49 in multiple fashion around own object 48 in such a way that contact just occurs between objects 48 and 49. In multiple assemblage 51, reference point "x" of the second object describes a contour that represents the outline (edge) of region 50. This is the region that is taken into consideration for the collision probability. This region must be checked as to whether, at a future point in time, reference point "x" of the second object will be located within it. If so, this corresponds to a collision. If such is not the case, then a collision does not exist.

FIG. 5 represents a simplified and therefore less accurate variant for determining the region, since the objects here are assumed to be circular, which in turn results in a circular region as the convolution result. This simplification was dispensed with in FIG. 6. Two oriented objects are depicted: own object 52 and second object 53. The convolution then results in region 55 depicted on the right side. Own object 52 is surrounded by other object 54, once again in contact, the orientation here being taken into consideration. Reference point "x" of the second object again describes the outline (edge) of region 55.

Figure 6:
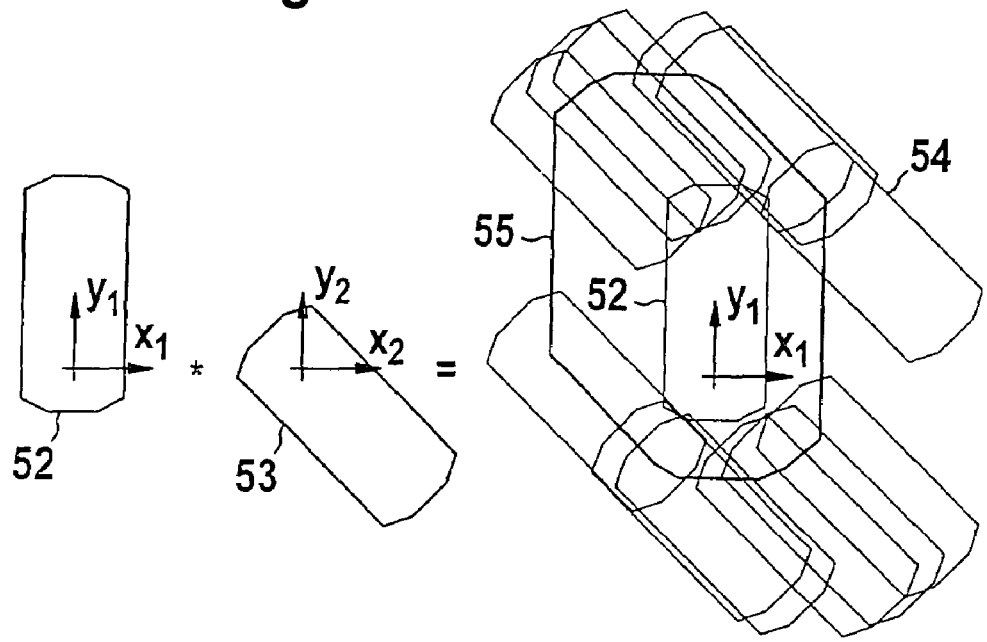
FIG. 6 shows a second model for determining the hazard probability.

In order to determine the region that is taken into account for the hazard probability, the procedure is at first exactly the same as depicted in FIGS. 5 and 6. In addition, region 50 or 55 is also convoluted with a further region disposed in circular fashion around the origin. The radius of this circle is to be interpreted as the minimum safe distance between the objects.

The sequence of the two convolutions is arbitrary, i.e. without changing the final result, it is possible instead to convolute one of the objects with the circular region and then to convolute the intermediate result with the other object.

The probabilities are determined by calculating probability density functions and integrating them, a determination being made on the basis of region 50 or 55, for each combination of the residence locations of the two objects (a residence location being determined in each case by the position of the object's reference point), as to whether or not a collision or hazard exists.

A quantization is used for the residence locations, the sampling being dense for short prediction times and more widely spaced for longer prediction times.

The non-action course is the course taken by the vehicle if no action is taken by the driver in order to modify the vehicle parameters, i.e. the speed and the acceleration vector. That course therefore continues to be followed if no changes are made by the driver in terms of steering or braking or acceleration. This typically occurs when the driver has not yet recognized the threatening situation or has assessed it incorrectly. The collision probability of the non-action course that is prepared by the driver behavior model is generally much greater than the probabilities of other possible courses. It is therefore advisable to model this non-action course separately, specifically with a greater precision, so that the remaining probability can then be distributed among all the other courses that the driver can take. These other courses are caused by braking, steering, or acceleration. The method according to the present invention for determining the accident risk, in which the collision probability and hazard probability are determined, depend on three parameters:

1) The initial states, made available by way of real-time sensor information, of the first and the further objects.

2) A vehicle dynamics model is used to predict future positions of the own vehicle and the other objects, taking into account the real-time sensor information.

3) A driver behavior model is used to assign probabilities of possible future positions of the own vehicle and the other objects.

The quality of the method according to the present invention can be enhanced by improving these input parameters. For example, using the object class as an input parameter increases the accuracy of the collision and hazard probabilities. This is because physical boundaries of the individual objects reduce the number of possible future positions of the respective object.

Instead of considering vehicle dynamics models, it is also possible to select general dynamics models that incorporate pedestrians as well. This also applies to the concept of the driver behavior model, which can be expanded to a general behavior model and also takes pedestrians into consideration.

What is claimed is:

1. A method for determining an accident risk of a first object with at least one second object, comprising: determining the accident risk as a function of a collision probability and a hazard probability of the at least one second object in a predefined region, and determining the collision probability and the hazard probability as a function of motions of the first and at least one second object.

2. The method according to claim 1, wherein an object class of the first and at least one second object are taken into account in determining the collision probability and the hazard probability.

3. The method according to claim 2, wherein the motion and the object class of the at least one second object are determined by way of a sensor suite, and the motion and the object class of the first object are retrieved from at least one data source.

4. The method according to claim 2, wherein the motion of the first object is defined by at least one current position and its velocity.

5. The method according to claim 2, wherein the motion of the at least one second object is defined by at least one current position.

6. The method according to claim 1, wherein the motion and the object class of the at least one second object are determined by way of a sensor suite, and the motion and the object class of the first object are retrieved from at least one data source.

7. The method according to claim 6, wherein the motion of the at least one second object is defined by at least one current position.

8. The method according to claim 1, wherein the motion of the first object is defined by at least one current position and its velocity.

9. The method according to claim 8, wherein the motion of the at least one second object is defined by at least one current position.

10. The method according to claim 8, wherein the motion of the first object is additionally determined by way of at least one of its first longitudinal acceleration, first transverse acceleration, a first rotation angle and a first steering angle.

11. The method according to claim 10, wherein at least one of environmental influences and a respective driving behavior are taken into account in determining the respective motion.

12. The method according to claim 1, wherein the motion of the at least one second object is defined by at least one current position.

13. The method according to claim 12, wherein the motion of the at least one second object is determined by at least one of its velocity relative to the first object, a second longitudinal acceleration, a second transverse acceleration and a second rotation angle.

14. The method according to claim 13, wherein at least one of environmental influences and a respective driving behavior are taken into account in determining the respective motion.

15. The method according to claim 1, wherein at least one of an indication and at least one signal to an actuator suite are generated as a function of the accident risk.

16. The method according to claim 1, wherein an object class of the first and at least one second object are taken into account in determining the collision probability and the hazard probability, wherein the motion and the object class of the at least one second object are determined by way of a sensor suite, and the motion and the object class of the first object are retrieved from at least one data source, wherein the motion of the first object is defined by at least one current position and its velocity, wherein the motion of the at least one second object is defined by at least one current position.

17. The method according to claim 16, wherein the motion of the first object is additionally determined by way of at least one of its first longitudinal acceleration, first transverse acceleration, a first rotation angle and a first steering angle, and wherein the motion of the at least one second object is determined by at least one of its velocity relative to the first object, a second longitudinal acceleration, a second transverse acceleration and a second rotation angle.

18. The method according to claim 16, wherein at least one of environmental influences and a respective driving behavior are taken into account in determining the respective motion, and wherein at least one of an indication and at least one signal to an actuator suite are generated as a function of the accident risk.

* * * * *

UNITED STATES PATENT AND TRADEMARK OFFICE
CERTIFICATE OF CORRECTION

PATENT NO.       : 7,617,048 B2                          Page 1 of 1
APPLICATION NO. : 10/533778
DATED            : November 10, 2009
INVENTOR(S)      : Simon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this

Nineteenth Day of October, 2010

David J. Kappos
*Director of the United States Patent and Trademark Office*